May 3, 1932. C. A. CAMPBELL 1,856,209
AIR BRAKE
Filed Dec. 28, 1929
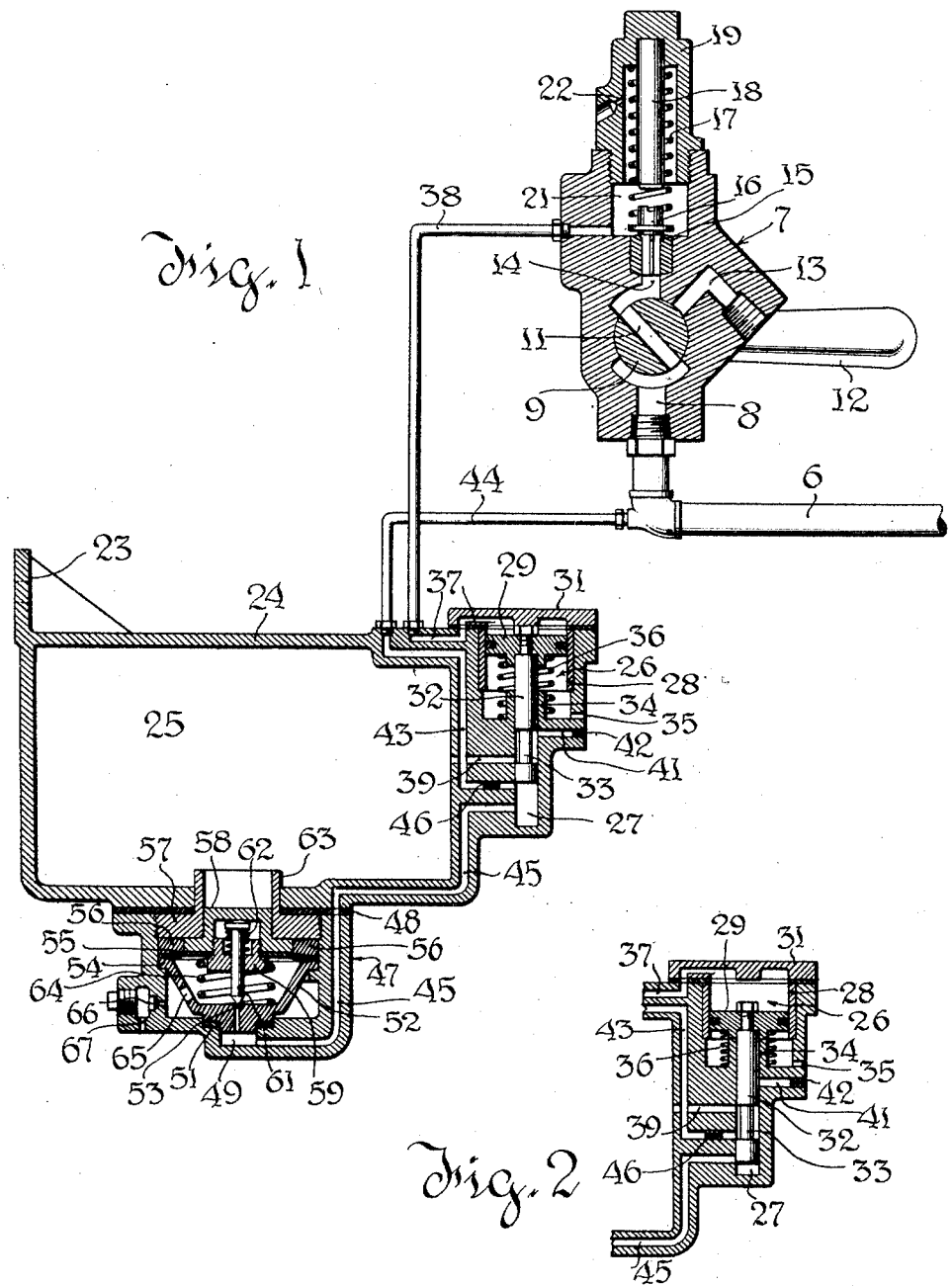
Inventor
Charles A. Campbell
By Dodge and Jm.
Attorneys Patented May 3, 1932

1,856,209

REISSUED

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

AIR BRAKE

Application filed December 28, 1929. Serial No. 417,143.

This invention relates to fluid pressure brakes and analogous apparatus, and particularly to retainer valves.

Generally stated a retainer valve is a valve applied to the exhaust port of the triple valve (or its equivalent) to permit the recharge of the auxiliary reservoir without causing the complete or immediate release of brake cylinder pressure. Retainer valves in common use to-day comprise a loaded relief valve, which, when the triple valve moves to release position, serves to limit the exhaust of brake cylinder pressure and prevent reduction below a definite pressure. At this definite pressure the retainer valve closes to prevent exhaust of brake cylinder pressure through the triple valve exhaust. In conjunction with such loaded valve there is used a choke or restricted port to control the rate of flow through the retainer valve and thus delay the reduction of brake cylinder pressure to the retained value.

The object of the present invention is to extend the utility of the retainer valve by producing a device which will first reduce brake cylinder pressure at a restricted rate to a definite retained value, then retain that pressure for a relatively uniform period of time and thereafter reduce brake cylinder pressure to atmosphere at a restricted rate which may be the same as, or different from, the first rate of reduction, as may be determined by the design of the device. This character of operation will afford sufficient time for recharging of the reservoir, and will reduce the danger of stalling the train which is encountered with prior types of retainer in some classes of service.

Generally stated, the invention contemplates the use with any conventional retainer valve of a delayed action exhaust means for venting the brake cylinder, and some means of starting it into action upon the closing of the retainer valve.

The preferred embodiment of the invention is illustrated in the accompanying drawings, in which,—

Fig. 1 is a vertical axial section of the retainer valve and the delayed action exhaust mechanism.

Fig. 2 is a fragmentary section of a portion of the delayed action mechanism showing the piston and valve in a different position.

The retainer pipe is shown at 6, and, as usual, is connected with the exhaust port of an ordinary triple valve or its equivalent (not shown). All air exhausted from the brake cylinder through the triple valve passes through this pipe. The body of a retainer valve of conventional form is indicated generally by the numeral 7. The body 7 is connected with the end of the pipe 6 so that the pipe communicates with a passage 8. There is a rotary cock plug 9 in the body 7, and this has a through port 11. The plug 9 may be rotated by handle 12 to two different positions, in one of which port 11 connects the passage 8 with a free exhaust passage 13 and in the other of which passage 8 is connected with a passage 14.

The passage 14 leads to the seat 15 of a poppet-type retaining valve 16 which is urged closed by a spring 17. The strength of spring 17 and the area of valve 16 determine the degree of pressure retained. The spring 17 surrounds a combined spring guide and valve stop 18, which is fixed within a bonnet 19 threaded into the body 7 and serves to limit the opening movement of valve 16. The body 7 and bonnet 19 are recessed to form a chamber 21 above the valve 16. Discharge from this chamber is controlled by a choke port 22, whose size is chosen to give the desired rate of brake cylinder reduction past the retaining valve 16.

This device will be recognized as a standard type of retainer valve mechanism. The mechanism about to be described is preferably, but not necessarily, constructed as a separate unit, as shown.

Mounted on a bracket 23 is a casting 24 whose form is clearly shown in the drawings. This includes a timing chamber or reservoir 25, a cylinder 26 and a cylindrical valve chamber 27 axially alined with cylinder 26 and formed as an extension thereof.

The cylinder 26 is bushed, as indicated at 28, to receive a piston 29 and the upper end of the cylinder is closed by a removable head 31. Rigidly attached to piston 29 is the cylindrical piston valve 32, which makes a free but approximately air tight sliding fit with valve chamber 27. The valve has a port in the form of an annular groove or reduction 33. Upward motion of the valve is limited by collision of piston 29 with a central boss on head 31 (see Fig. 1). Downward motion is limited by collision of the hub of piston 29 with boss 34 (see Fig. 2).

The space below piston 29 is vented to atmosphere at 35, and a spring 36 normally holds the piston at its upward limit of motion. Preferably the strength of the spring is little more than sufficient to overcome the weight and friction of the piston and connected parts, so that the piston will be depressed its full stroke by a light pressure acting downward on the piston.

The space above piston 29 is connected by port 37 and pipe 38 with chamber 21, so that when valve 16 opens, the back pressure developed by choke 22 will act on piston 29 and force it downward. After valve 16 closes the choke port 22 will dissipate the back pressure and spring 36 will restore piston 29.

The valve chamber 27 is the terminus of four ports, which are controlled by valve 32. When the piston 29 is in its normal upward position, port 39 leading to chamber 25 is connected with atmospheric exhaust port 41 by the port 33. This vents chamber 25 to atmosphere, the rate of venting flow being controlled by an inserted choke 42 of appropriate size. In the same position of the piston, valve 32 is above port 43 which communicates with pipe 6 by pipe 44. It follows that port 43 is in free communication with port 45 which leads to the final exhaust valve, later to be described. A choke 46 inserted in port 43 controls the rate of flow in said port. When piston 29 is forced to its lower position, ports 41 and 45 are blanked and port 33 connects ports 43 and 39 to charge chamber 25 from the brake cylinder.

As above suggested, port 45 is controlled by the final exhaust valve. This is a valve which is held closed by pressure in chamber 25. The housing for the final exhaust valve is a casting 47 bolted to casting 24 with an intervening gasket 48. The port 45 is continued in casting 47 and leads to a recess 49.

Seated in recess 49 and sealed by gasket 51 is a spider 52 formed with a valve seat 53 and a diaphragm supporting ring 54. The ring 54 seats on a shoulder in casting 47 and has a beveled upper face against which is clamped a flexible diaphragm 55, by means of clamping ring 56 and the annular threaded member 57.

A hub member 58 is clamped to the center of diaphragm 55 by a threaded member 59 which passes through a hole in the center of the diaphragm. The member 58 is guided in vertical movements by member 57 and in conjunction with member 59 carries the usual pin valve 61. According to the usual pin valve constructions valve 61 is loosely mounted. Its stem is headed and has a surrounding spring 62 which holds the valve upward against member 58. The valve 61 thus may aline itself with the seat 53.

The member 57 has a flange 63 which projects through an opening in the wall of chamber 25, and diaphragm 55 is thus subject on its upper face to pressure in said chamber. A spring 64 urges the diaphragm upward, but its strength is preferably little more than sufficient to hold valve 61 open when chamber 25 is at atmospheric pressure.

Air passing valve seat 53 passes to atmosphere by port 65, choke port 66 and passage 67.

The operation of the device can now be described.

If the handle 12 be turned so that passage 11 connects pipe 6 with atmospheric port 13, the retainer is out of action and exhaust occurs normally from the triple valve.

If the plug be turned to the position shown in Fig. 1 prior to the releasing movement of the triple valve, the device will perform its retaining function. In such case air will flow through pipe 6, passages 8, 11 and 14, will lift the valve 16 and flow to atmosphere by way of chamber 21 and choke 22.

The effect of choke 22 will be to establish a pressure in chamber 21, intermediate brake cylinder pressure and atmospheric pressure, and such pressure will be transmitted through pipe 38 and port 37 to the space above the piston 29. As the spring 36 is a relatively light spring, piston 29 will move downward almost immediately to the position shown in Fig. 2. Then air will flow from the pipe 6 through the pipe 44, port 43 (at a rate controlled by choke 46) through recess 33 and port 39 to the chamber 25. In this way the chamber 25 will be charged and the pin valve 61 will close. At such time, however, port 45 is blanked by the end of the valve 32.

When valve 16 is eventually closed by spring 17, chamber 25 will have been charged to a pressure substantially equal to the retained brake cylinder pressure. When valve 16 closes, port 22 bleeds the pressure in chamber 21 down to atmospheric pressure so that spring 36 forces piston 29 to its upward position (see Fig. 1).

The shift in the position of valve 32 causes the recess 33 to connect ports 39 and 41 and at the same time connect ports 43 and 45. Under this last condition chamber 25 is vented at a rate determined by the size of choke 42 and pipe 6 is connected with port 45 by way of pipe 44, port 43 and choke 46. The pin valve 61 now controls a direct exhaust from the pipe 6. When pressure in chamber 25 drops sufficiently (i.e., nearly to atmospheric) the spring 64 shifts the diaphragm 55 and the pin valve 61 upward allowing exhaust to occur by way of ports 65, 66 and 67. Thereupon brake cylinder pressure is discharged to atmosphere at a rate controlled by the conjoint action of the choke 46 and the restricted port 66.

It is desirable to use two restricted ports 46 and 66 in series because two choke ports of moderate size connected in series can be made to give the same flow rate as a much smaller single choke port. It is desirable to avoid small chokes because of the risk of their becoming clogged.

While the arrangement shown is preferred, various modifications are possible within the scope of the invention, and the above details of construction are therefore to be considered as illustrative and not limiting.

What is claimed is,—

1. The combination with a retainer valve operable to open and bleed brake cylinder pressure down to a definite value and then close, of a delayed action exhaust means put into action by the closing of the retainer valve and serving to hold and then vent the remaining brake cylinder pressure.

2. The combination with a retainer valve operable to open and bleed brake cylinder pressure down to a definite value and then close, of a delayed action exhaust means put into action by the closing of the retainer valve and serving to hold and then vent the remaining brake cylinder pressure at a restricted rate.

3. The combination with a retainer valve operable to bleed brake cylinder pressure down to a definite value and then close, of a timing mechanism and associated brake cylinder vent means rendered operative by the opening and subsequent closing of said retainer valve, and serving to retain brake cylinder pressure for an interval after the closing of said retainer valve and then vent the brake cylinder.

4. The combination with a retainer valve operable to bleed brake cylinder pressure down to a definite value and then close, of a timing mechanism and associated brake cylinder vent means rendered operative by the opening and subsequent closing of said retainer valve, and serving to retain brake cylinder pressure for an interval after the closing of said retainer valve and then vent the brake cylinder at a restricted rate.

5. The combination with a retainer valve operable to open and bleed brake cylinder pressure down to a definite value and then close, of a timing chamber; valve means actuated by the opening of the retainer valve to charge said chamber and by the closing of said retainer valve to vent the chamber at a controlled rate; and an exhaust valve held closed by pressure in said chamber, and arranged to open and vent the brake cylinder upon depletion of pressure in said timing chamber.

6. The combination with a retainer valve operable to open and bleed brake cylinder pressure down to a definite value and then close, of a timing chamber; valve means actuated by the opening of the retainer valve to charge said chamber with air exhausted from said brake cylinder and by the closing of said retainer valve to vent the chamber at a controlled rate; and an exhaust valve held closed by pressure in said chamber and arranged to open and vent the brake cylinder upon depletion of pressure in said timing chamber.

7. The combination of a retainer valve operable to open and bleed brake cylinder pressure down to a definite value and then close; a choke associated with said valve and arranged to develop a back pressure when the valve is open; a timing chamber; a pressure actuated valve mechanism subject to said back pressure and arranged to charge said chamber when said back pressure exists and to vent said chamber at a controlled rate upon depletion of said back pressure; and an exhaust valve for the brake cylinder pressure, normally open but held closed by pressure in said timing chamber.

8. The combination of a retainer valve operable to open and bleed brake cylinder pressure down to a definite value and then close; a choke associated with said valve and arranged to develop a back pressure when the valve is open; a timing chamber; a pressure actuated valve mechanism subject to said back pressure and arranged to charge said chamber with air exhausted from said brake cylinder when said back pressure exists and to vent said chamber at a controlled rate upon depletion of said back pressure; and an exhaust valve for the brake cylinder pressure, normally open but held closed by pressure in said timing chamber.

9. The combination of a retainer valve operable to open and bleed brake cylinder pressure down to a definite value and then close; a restriction located in the path of air flow beyond said valve, and adapted to develop a back pressure between the valve and said restriction; a timing chamber; a normally open final exhaust valve adapted to be held closed by pressure in said timing chamber, and controlling a brake cylinder exhaust flow distinct from that through the retainer valve; an abutment subject to said back pressure; yielding means acting on said abutment in opposition to said back pressure; and a valve operated by said abutment and serving in one position to vent said timing chamber and in another position to charge said timing chamber.

10. The combination of a retainer valve operable to open and bleed brake cylinder pressure down to a definite value and then close; a restriction located in the path of air flow beyond said valve; and adapted to develop a back pressure between the valve and said restriction; a timing chamber; a normally open final exhaust valve adapted to be held closed by pressure in said timing chamber, and controlling a brake cylinder exhaust flow distinct from that through the retainer valve; an abutment subject to said back pressure; yielding means acting on said abutment in opposition to said back pressure; and a valve operated by said abutment and serving in one position to vent said timing chamber and in another position to charge said timing chamber and interrupt communication to said final exhaust valve.

In testimony whereof I have signed my name to this specification.

CHARLES A. CAMPBELL.